(12) United States Patent
Kamijima et al.

(10) Patent No.: US 10,223,046 B2
(45) Date of Patent: Mar. 5, 2019

(54) IMAGE PROCESSOR, PRINTING SYSTEM, AND IMAGE PROCESSING METHOD

(71) Applicant: SEIKO EPSON CORPORATION, Tokyo (JP)

(72) Inventors: Kanji Kamijima, Matsumoto (JP); Shusuke Kibune, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/877,124

(22) Filed: Jan. 22, 2018

(65) Prior Publication Data

US 2018/0217793 A1 Aug. 2, 2018

(30) Foreign Application Priority Data

Jan. 31, 2017 (JP) ................................. 2017-015974

(51) Int. Cl.
*G06F 15/00* (2006.01)
*G06F 3/12* (2006.01)
*B41J 29/38* (2006.01)
*G03G 15/00* (2006.01)
*H04N 1/21* (2006.01)

(52) U.S. Cl.
CPC ............ *G06F 3/1229* (2013.01); *B41J 29/38* (2013.01); *G03G 15/5087* (2013.01); *G06F 3/121* (2013.01); *G06F 3/122* (2013.01); *G06F 3/1207* (2013.01); *G06F 3/1238* (2013.01); *H04N 1/21* (2013.01)

(58) Field of Classification Search
CPC .... G06F 3/1229; G06F 3/1207; G06F 3/1238; G06F 3/122; B41J 29/38; G03G 15/5087; H04N 1/21
USPC ....................................................... 358/1.14
See application file for complete search history.

(56) References Cited

U.S. PATENT DOCUMENTS

2015/0091958 A1* 4/2015 Terada .................... B41J 25/003
347/9

FOREIGN PATENT DOCUMENTS

JP 2002-091748 3/2002

* cited by examiner

*Primary Examiner* — Saeid Ebrahimi Dehkordy
(74) *Attorney, Agent, or Firm* — Workman Nydegger

(57) ABSTRACT

An image processing apparatus includes a timing obtaining unit that obtains an interruption timing at which printing is interrupted in a printer that transports a printing medium in a first direction and performs printing on the printing medium, a division computing unit that arranges, at a position corresponding to the timing in a target area in which plural images are to be arranged, a virtual straight line extending through the target area in a second direction perpendicular to the first direction, an arrangement computing unit that separates and arranges the plural images in the target area divided by the virtual straight line into a first region downstream and a second region upstream in the first direction, and a data creating unit that creates and outputs, to the printer, first print data specifying the images arranged in the first region and second print data specifying the images arranged in the second region.

11 Claims, 6 Drawing Sheets

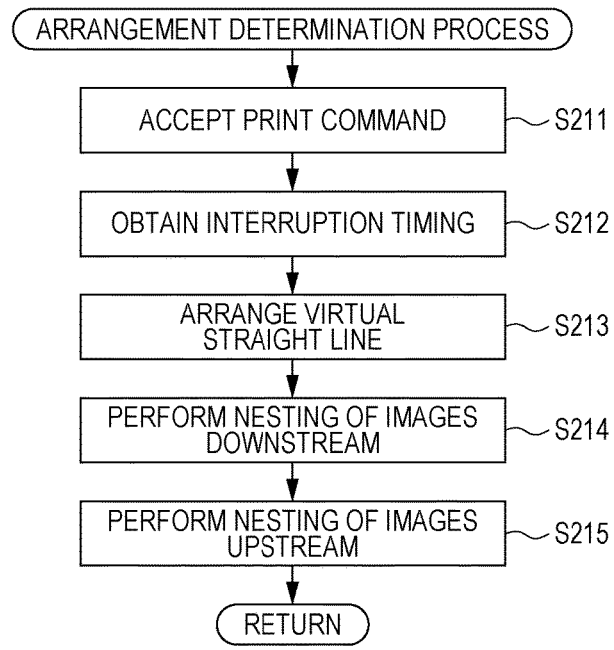
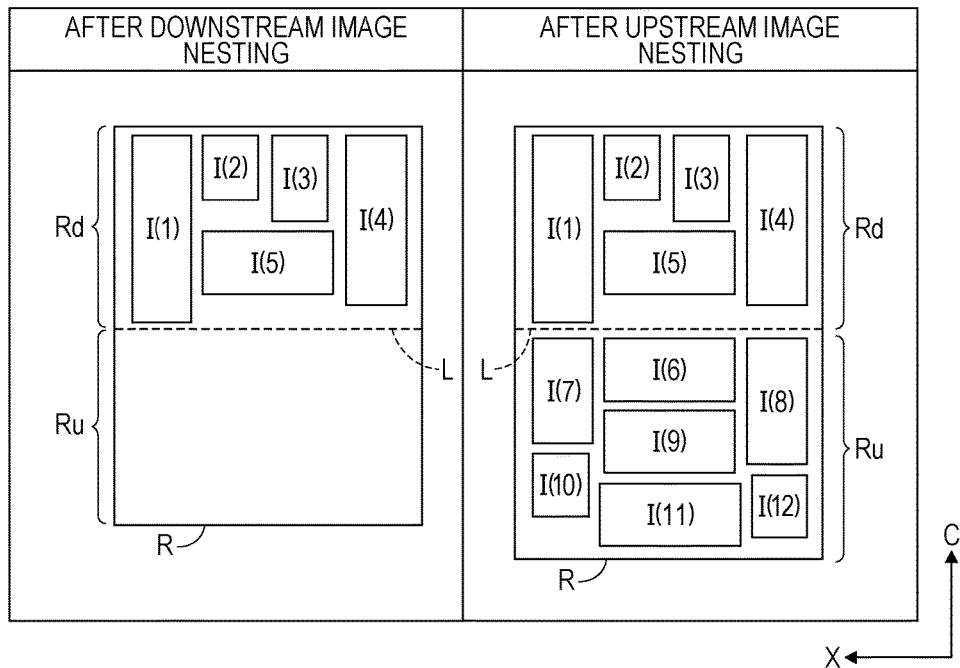

IMAGE PROCESSOR, PRINTING SYSTEM, AND IMAGE PROCESSING METHOD

The entire disclosure of Japanese Patent Application No: 2017-015974, filed Jan. 31, 2017 is expressly incorporated by reference herein in its entirety.

BACKGROUND

1. Technical Field

The present invention relates to a technique to address an interruption of printing of an image in a printer.

2. Related Art

In JP-A-2002-091748, a print job is divided into a plurality of jobs per page at a page break, and the divided jobs are each transferred to a printer.

Printers may often interrupt printing, as appropriate, to perform cleaning or to supply ink, for example. Such an interruption of printing sometimes occurs at a position other than a page break. When printing of an image is interrupted, the image is required to be printed again, which may result in a waste of ink and a deterioration of print quality, for example.

SUMMARY

An advantage of some aspects of the invention is to provide a technique to suppress, as much as possible, interruption to printing of an image in a printer.

An image processing apparatus according to an aspect of the invention includes a timing obtaining unit, a division computing unit, an arrangement computing unit, and a data creating unit. The timing obtaining unit obtains an interruption timing at which printing is interrupted in a printer that transports a printing medium in a first direction and that performs printing on the printing medium. The division computing unit arranges, at a position corresponding to the interruption timing in a target area in which a plurality of images is arranged, a virtual straight line extending through the target area in a second direction that is perpendicular to the first direction. The arrangement computing unit separates and arranges the plurality of images in the target area divided by the virtual straight line into a first region downstream in the first direction and a second region upstream in the first direction. The data creating unit creates and outputs, to the printer, first print data specifying images arranged in the first region and second print data specifying images arranged in the second region, among the plurality of images.

A printing system according to an aspect of the invention includes a printer and an image processing apparatus. The printer transports a printing medium in a first direction and performs printing on the printing medium. The image processing apparatus includes a timing obtaining unit, a division computing unit, an arrangement computing unit, and a data creating unit. The timing obtaining unit obtains an interruption timing at which printing is interrupted in the printer. The division computing unit arranges, at a position corresponding to the interruption timing in a target area in which a plurality of images is arranged, a virtual straight line extending through the target area in a second direction that is perpendicular to the first direction. The arrangement computing unit separates and arranges the plurality of images in the target area divided by the virtual straight line into a first region downstream in the first direction and a second region upstream in the first direction. The data creating unit creates and outputs, to the printer, first print data specifying images arranged in the first region and second print data specifying images arranged in the second region, among the plurality of images. The printer prints the images specified in the first print data on the printing medium and the images specified in the second print data on the printing medium.

An image processing method according to an aspect of the invention includes obtaining an interruption timing at which printing is interrupted in a printer that transports a printing medium in a first direction and that performs printing on the printing medium, arranging, at a position corresponding to the interruption timing in a target area in which a plurality of images is arranged, a virtual straight line extending through the target area in a second direction that is perpendicular to the first direction, separating and arranging the plurality of images in the target area divided by the virtual straight line into a first region downstream in the first direction and a second region upstream in the first direction, and creating and outputting, to the printer, first print data specifying images arranged in the first region and second print data specifying images arranged in the second region, among the plurality of images.

With the above aspects of the invention (image processing apparatus, printing system, and image processing method) configured as described above, an interruption timing at which printing is interrupted in the printer that transports a printing medium in the first direction and that performs printing on the printing medium is obtained. At a position corresponding to the interruption timing in a target area in which a plurality of images is arranged, a virtual straight line extending through the target area in a second direction that is perpendicular to the first direction is arranged. The plurality of images is separated and arranged in the target area divided by the virtual straight line into a first region downstream in the first direction and a second region upstream in the first direction. In other words, the plurality of images is separated and arranged in the first region and the second region so that the images do not lie on a position (virtual straight line) corresponding to the interruption timing at which printing is interrupted in the printer. First print data specifying the images arranged in the first region and second print data specifying the images arranged in the second region are then created and output to the printer. As a result, interruption to printing of the images can be suppressed, as much as possible, in the printer that performs printing using the first and second print data.

The image processing apparatus may be configured such that the arrangement computing unit arranges the plurality of images in the target area without taking into account the virtual straight line arranged in the target area and then separates and arranges the plurality of images in the first and second regions by shifting, among the plurality of images, a position of images each having an upstream end in the first direction located upstream of the virtual straight line to move images lying on the virtual straight line among the plurality of images, upstream in the first direction and away from the virtual straight line. The plurality of images can thus be appropriately separated and arranged in the first and second regions.

The image processing apparatus may be configured such that the data creating unit outputs a reverse transport command to the printer, after the images specified in the first print data are printed and before the images specified in the second print data are printed. The reverse transport command provides an instruction to transport the printing medium upstream in the first direction from a position at which the images specified in the first print data are printed by a reverse transport amount that corresponds to an amount with which the images are moved by the arrangement computing unit. The printing medium can thus be transported by a necessary amount downstream in the first direction, saving space on the printing medium.

The image processing apparatus may be configured such that the arrangement computing unit arranges the virtual straight line in the target area and then separates and arranges the plurality of images in the first and second regions by arranging some images among the plurality of images away from the virtual straight line in the first region and by arranging remaining images among the plurality of images away from the virtual straight line in the second region. The plurality of images can thus be appropriately separated and arranged in the first and second regions.

The image processing apparatus may be configured such that the printer interrupts printing to perform cleaning of a head and that the timing obtaining unit obtains, as an interruption timing, a timing at which the cleaning is performed. With the configuration, interruption to printing of images can be suppressed, as much as possible, to perform cleaning by the printer.

The image processing apparatus may be configured such that the data creating unit includes a rendering unit and a halftone processing unit. The rendering unit performs rendering of the images in the first region and then performs rendering of the images in the second region. The halftone processing unit creates the first print data by performing, while the rendering unit performs rendering of the images in the second region, a halftone process on the images in the first region on which rendering is performed by the rendering unit. With the configuration, after rendering of the images in the first region is completed, a halftone process is performed on the images in the first region while rendering of the images in the second region is performed. In other words, before the rendering of the images in the second region is completed, a halftone process is immediately performed on the images in the first region. The images in the first region on which the halftone process are performed are then output to the printer. As a result, printing begins promptly.

An image processing apparatus according to an aspect of the invention includes a timing obtaining unit, an arrangement determination unit, and a data creating unit. The timing obtaining unit obtains an interruption timing at which printing is interrupted in a printer that transports a printing medium and that performs printing on the printing medium. The arrangement determination unit separates a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing. The data creating unit creates and outputs, to the printer, first print data specifying the first images arranged in the first region and second print data specifying the second images arranged in the second region.

A printing system according to an aspect of the invention includes a printer and an image processing apparatus. The printer transports a printing medium and performs printing on the printing medium. The image processing apparatus includes a timing obtaining unit, an arrangement determination unit, and a data creating unit. The timing obtaining unit obtains an interruption timing at which printing is interrupted in the printer. The arrangement determination unit separates a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing. The data creating unit creates and outputs, to the printer, first print data specifying the first images arranged in the first region and second print data specifying the second images arranged in the second region. The printer prints the first images specified in the first print data on the printing medium and the second images specified in the second print data on the printing medium.

An image processing method according to an aspect of the invention includes obtaining an interruption timing at which printing is interrupted in a printer that transports a printing medium and that performs printing on the printing medium, separating a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing, and creating and outputting, to the printer, first print data specifying the first images arranged in the first region and second print data specifying the second images arranged in the second region.

With the above aspects of the invention (image processing apparatus, printing system, and image processing method) configured as described above, a plurality of images is separated into first images printing of which is completed before an interruption timing and second images printing of which is uncompleted before the interruption timing, and the first images are arranged in a first region in which printing is performed before the interruption timing and the second images are arranged in a second region in which printing is performed after the interruption timing. First print data specifying the first images arranged in the first region and second print data specifying the second images arranged in the second region are created and output to the printer. As a result, interruption to printing of the images can be suppressed, as much as possible, in the printer that performs printing using the first and second print data.

BRIEF DESCRIPTION OF THE DRAWINGS

The invention will be described with reference to the accompanying drawings, wherein like numbers reference like elements.

FIG. 10 is a flowchart illustrating a modified example of the arrangement determination process performed in FIG. 3.

FIG. 11 is a diagram illustrating an example of an arithmetic operation performed in accordance with the flowchart in FIG. 10.

DESCRIPTION OF EXEMPLARY EMBODIMENTS

Figure 1:
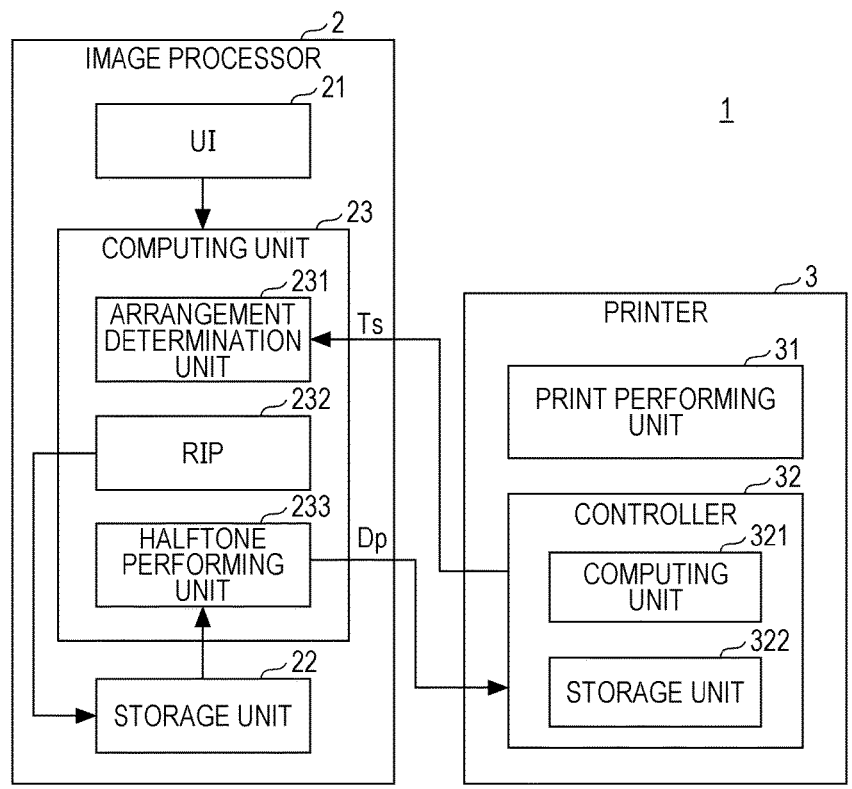
FIG. 1 is a diagram illustrating an example of a printing system according to the invention.

FIG. 1 is a diagram illustrating an example of a printing system according to the invention. A printing system 1 includes an image processing apparatus 2 and a printer 3. The image processing apparatus 2 creates print data Dp. The printer 3 performs printing using the print data Dp. The image processing apparatus 2 is a personal computer, for example, and includes a user interface (UI) 21, a storage unit 22, and a computing unit 23. The UI 21 includes input devices, such as a mouse and a keyboard, for accepting instructions entered by a user and output devices, such as a display, for providing information to the user. The UI 21 may be a touch panel in which functions of the input devices and the output devices are integrated. The storage unit 22 includes a hard disc drive (HDD) and stores software installed in the image processing apparatus 2 and various data. The computing unit 23 includes a central processing unit (CPU) and a random access memory (RAM) to perform arithmetic operations specified in the software, for example.

In the image processing apparatus 2, when a user enters a print command via the UI 21, the computing unit 23 creates and outputs, to the printer 3, print data Dp corresponding to images specified in the print command. The computing unit 23 runs the software to configure an arrangement determination unit 231, a raster image processing apparatus (RIP) 232, and a halftone performing unit 233. The arrangement determination unit 231 performs nesting of the plurality of images (image data) specified in the print command. The term "nesting" herein denotes an arithmetic operation used to determine an arrangement of the plurality of images specified in the print command accepted via the UI 21 to reduce margins. Nesting is performed to optimize the arrangement of the plurality of images. The RIP 232 performs rendering (rasterization) on the images (image data). The halftone performing unit 233 performs a halftone process on the images (raster data) having undergone rendering. Print data Dp is thus created. A method of creating print data Dp will be described later in detail.

The printer 3 includes a print performing unit 31 and a controller 32. The print performing unit 31 is a mechanical component that performs printing. The controller 32 controls operation of the print performing unit 31. The controller 32 includes a computing unit 321 and a storage unit 322. The computing unit 321 includes a CPU and a RAM and performs arithmetic operations to control the print performing unit 31. The storage unit 322 includes an HDD and stores print data Dp received from the image processing apparatus 2.

Figure 2:
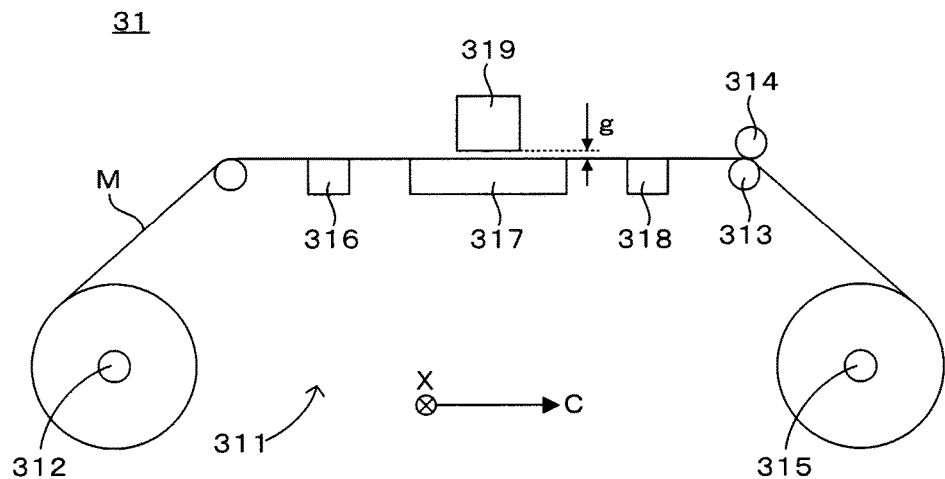
FIG. 2 is a schematic view illustrating an example of a print performing unit of a printer.

FIG. 2 is a schematic view of an example of the print performing unit of the printer. The print performing unit 31 of the printer 3 includes a transporter 311 that transports, in a roll-to-roll manner, a printing medium M (rolled paper) in a transport direction C. The transporter 311 includes a delivery roller 312, a pair of rollers 313 and 314, and a winding roller 315 arranged in this order in the transport direction C of the printing medium M. The delivery roller 311 delivers, in the transport direction C, the printing medium M wound in a roll. The pair of rollers 313 and 314 pinch the printing medium M pulled by the winding roller 315. The roller 314 is biased toward the roller 313 to apply a constant load to the printing medium M. The roller 313 meanwhile applies a predetermined torque to the printing medium M. The printing medium M is thus transported in the transport direction C under a constant tension. The printing medium M transported from the pair of rollers 313 and 314 is wound by the winding roller 315.

Between the delivery roller 312 and the roller 313, the printer 3 includes a pre-heater 316, a platen-heater 317, and an after-heater 318 arranged in this order in the transport direction C. The heaters heat the printing medium M when the printing medium M comes into contact with the top faces of the heaters. The printer 3 further includes a print head 319 that faces the platen-heater 317 with a predetermined platen gap g. The print head 319 includes a plurality of nozzles that is open on a face (nozzle-defined face) facing the platen-heater 317. The nozzles discharge ink in an ink jet manner. The print head 319 is able to discharge, via the plurality of nozzles, ink onto the printing medium M within a given range, i.e., an ink landing range.

In the printer 3, the transporter 311 intermittently transports the printing medium M in the transport direction C to feed an un-printed region of the printing medium M to a position above the platen-heater 317. The print head 319 performs a main scan in which the print head moves in a scan direction X that is perpendicular to the transport direction C to discharge ink. The number of times that the print head 319 performs the main scan can be specified, as appropriate, at this time (pass count), and the print head 319 performs the main scan repeatedly until the specified pass count is satisfied. By allowing the print head 319 to be controlled by the controller 32 to perform the main scan, the images specified in the print data Dp are printed on the printing medium M positioned above the platen-heater 317. Each time the printing medium M is intermittently transported, the main scan is performed on the printing medium M. The main scan repeats until a predetermined pass count is satisfied. The images are thus printed on the printing medium M extending in the transport direction C.

When instructed by the controller 32, the print performing unit 31 performs cleaning of the print head 319. Specifically, cleaning includes wiping, in which a wiper moves on the nozzle-defined face of the print head 319, and vacuuming, in which the nozzles of the print head 319 are vacuum-cleaned, for example. While cleaning takes place, the controller 32 prohibits the print performing unit 31 from performing printing on the printing medium M. In other words, while cleaning takes place, the controller 32 causes the print performing unit 31 to interrupt printing. After the cleaning is completed, the controller 32 allows the print performing unit 31 to resume printing.

Figure 3:
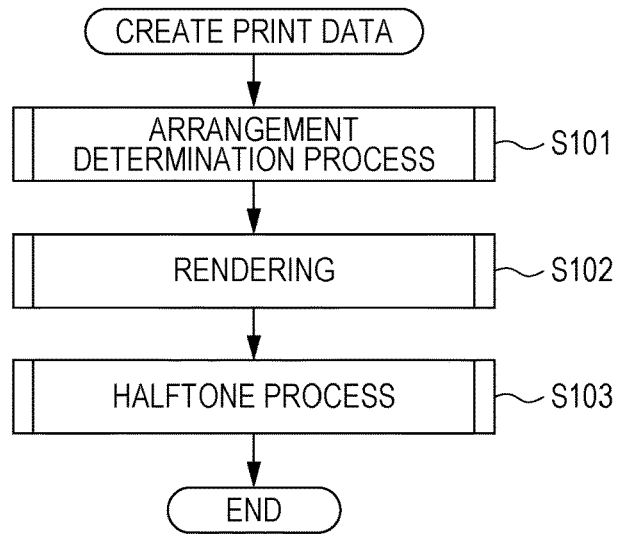
FIG. 3 is a flowchart illustrating an example of a method of creating print data performed by an image processing apparatus.

The image processing apparatus 2 of the printing system 1 creates print data Dp by taking into account when the printer 3 performs cleaning, i.e., when the printer 3 interrupts printing. FIG. 3 is a flowchart illustrating an example of a method of creating print data performed by the image processing apparatus. In particular, FIG. 3 illustrates a case where the UI 21 accepts a print command that provides an instruction to perform nesting printing of a plurality of images. In this case, the arrangement determination unit 231 performs an arrangement determination process (step S101), the RIP 232 performs rendering (step S102), and the halftone performing unit 233 performs a halftone process (step S103) in this order to create print data Dp.

Figure 4:
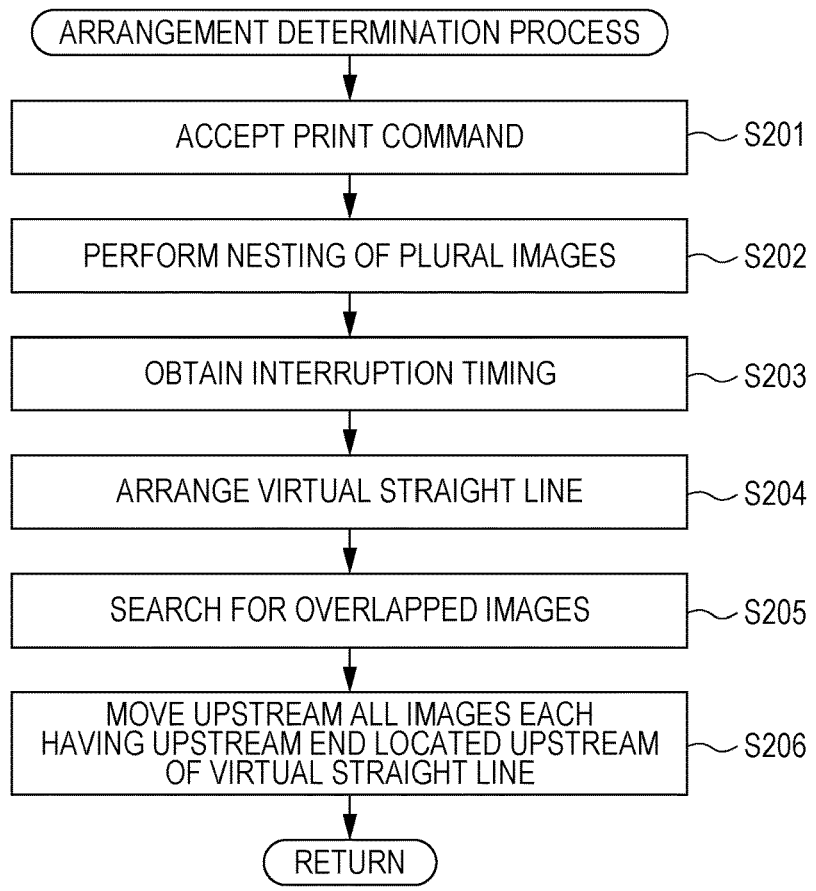
FIG. 4 is a flowchart illustrating an example of an arrangement determination process performed in FIG. 3.
Figure 5:
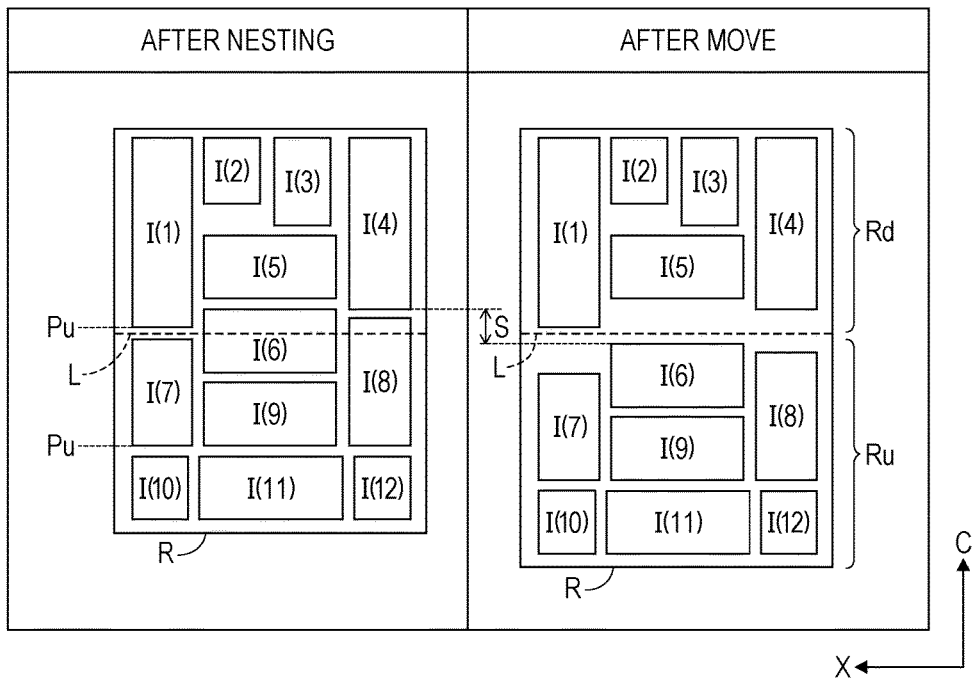
FIG. 5 is a diagram illustrating an example of an arithmetic operation performed in accordance with the flowchart in FIG. 4.

FIG. 4 is a flowchart illustrating an example of the arrangement determination process performed in step S101 in FIG. 3. FIG. 5 is a diagram illustrating an example of an arithmetic operation performed in accordance with the flowchart in FIG. 4. In step S201, the arrangement determination unit 231 accepts a print command entered via the UI 21. In the example, the print command, which provides an instruction to perform nesting printing of a plurality of images I is accepted, and the arrangement determination unit 231 performs nesting of the plurality of images I (step S202). As illustrated in the column titled "AFTER NESTING" in FIG. 5, an arrangement in which the plurality of images I is arranged in a two-dimensional manner in the transport direction C and the scan direction X is determined. FIG. 5 illustrates numbers in parentheses to make each of the plurality of images I distinct from each other. Like numbers are used as required in the following drawings.

In step S203, the arrangement determination unit 231 obtains a printing-interruption timing Ts from the controller 32 of the printer 3. In a virtual range R in which the plurality of images I is arranged, the arrangement determination unit 231 arranges a virtual straight line L at a position corresponding to the interruption timing Ts (step S204). The term "virtual range R" herein denotes a range that is provided in a virtual manner on the printing medium M in the print performing unit 31. The term "virtual straight line L" herein denotes a linear area extending parallel to the scan direction X through the virtual range R, the area corresponding to the ink landing range of the print head 319 when printing that is started before the interruption timing Ts is interrupted at the interruption timing Ts.

In step S205, from among the plurality of images I arranged as determined in step S202, the arrangement determination unit 231 searches for an image I (overlapped image I) lying on the virtual straight line L. In the example illustrated in FIG. 5, images I(6) and I(8) are retrieved as overlapped images I. In step S206, the arrangement determination unit 231 performs an arithmetic operation of moving, upstream in the transport direction C and away from the virtual straight line L, all of the images I (I(6) to I(12)), each having an upstream end Pu located upstream of the virtual straight line L in the transport direction C so that the images I(6) and I(8) lying on the virtual straight line L are moved upstream in the transport direction C and away from the virtual straight line L. In the column titled "AFTER NESTING" in FIG. 5, upstream ends Pu are applied to only the images I(1) and I(7). However, upstream ends Pu may be applied to all of the images I.

As described above, the images I(6) to I(12) are moved upstream in the transport direction C by an amount S. As a result, as illustrated in the column titled "AFTER MOVE" in FIG. 5, the arrangement of the images I(1) to I(12), in which the images I(1) to I(5) are arranged downstream of the virtual straight line L in the transport direction C and the images I(6) to I(12) are arranged upstream of the virtual straight line L in the transport direction C, is finally determined. When the arrangement of the images I is thus determined, rendering in step S102 of the flowchart in FIG. 3 starts.

Figure 6:
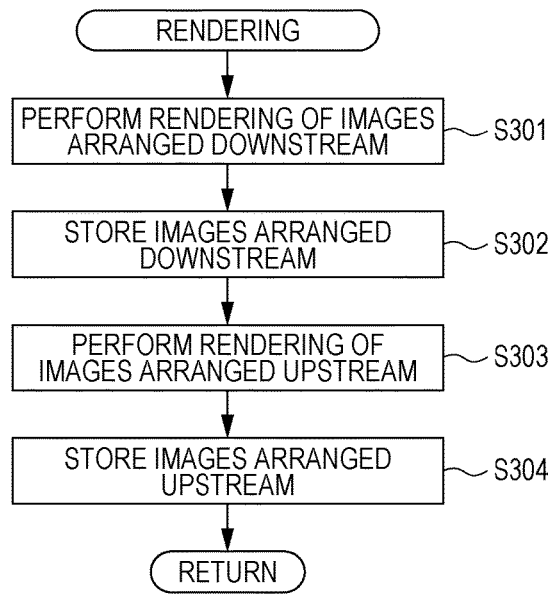
FIG. 6 is a flowchart illustrating an example of rendering performed in FIG. 3.

FIG. 6 is a flowchart illustrating an example of rendering performed in step S102 in FIG. 3. In step S301, among the plurality of images I(1) to I(12), the RIP 232 performs rendering of the images I(1) to I(5) arranged downstream of the virtual straight line L in the transport direction C. Specifically, rendering is performed on a laid-out image in which the images I(1) to I(5) are arranged downstream as determined in step S101. The RIP 232 then stores, in the storage unit 22, the images I(1) to I(5) arranged downstream and having undergone rendering (raster data) (step S302).

In step S303, among the plurality of images I(1) to I(12), the RIP 232 performs rendering of the images I(6) to I(12) arranged upstream of the virtual straight line L in the transport direction C. Specifically, rendering is performed on a laid-out image in which the images I(6) to I(12) are arranged upstream as determined in step S101. The RIP 232 then stores, in the storage unit 22, the images I(6) to I(12) arranged upstream and having undergone rendering (raster data) (step S304). The halftone performing unit 233 performs a halftone process on the images I(1) to I(12) stored in the storage unit 22 as described above (step S103 in FIG. 3).

Figure 7:
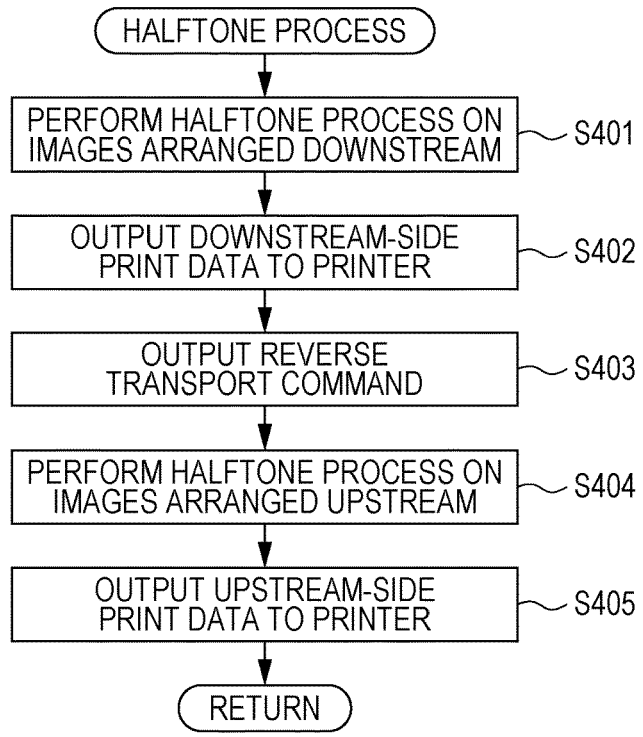
FIG. 7 is a flowchart illustrating an example of a halftone process performed in FIG. 3.

FIG. 7 is a flowchart illustrating an example of the halftone process performed in step S103 in FIG. 3. In step S401, the halftone performing unit 233 performs the halftone process on the images I(1) to I(5) arranged downstream, having undergone rendering, and being stored in the storage unit 22. The halftone performing unit 233 outputs, to the printer 3, as downstream-side print data Dpd, print data Dp specifying the images I(1) to I(5) arranged downstream and having undergone the halftone process (step S402). After the images I(1) to I(5) arranged downstream undergo rendering in step S301, the halftone process is performed on the images I(1) to I(5) arranged downstream in step S401 (i.e., asynchronously), while rendering is performed on the images I(6) to I(12) arranged upstream in step S303.

In step S403, the halftone performing unit 233 outputs a reverse transport command to the printer 3. The reverse transport command is a command that provides an instruction to transport (reverse transport), after the images I(1) to I(5) are printed using the downstream-side print data Dpd, the printing medium M upstream in the transport direction C by the amount S from a position at which the printing is completed.

In step S404, the halftone performing unit 233 performs the halftone process on the images I(6) to I(12) arranged upstream, having undergone rendering, and being stored in the storage unit 22. The halftone performing unit 233 outputs, to the printer 3, as upstream-side print data Dpu, print data Dp specifying the images I(6) to I(12) arranged upstream and having undergone the halftone process (step S405). Creation of print data in FIG. 3 is completed as described above. The printer 3 performs printing using the created print data Dp.

Figure 8:
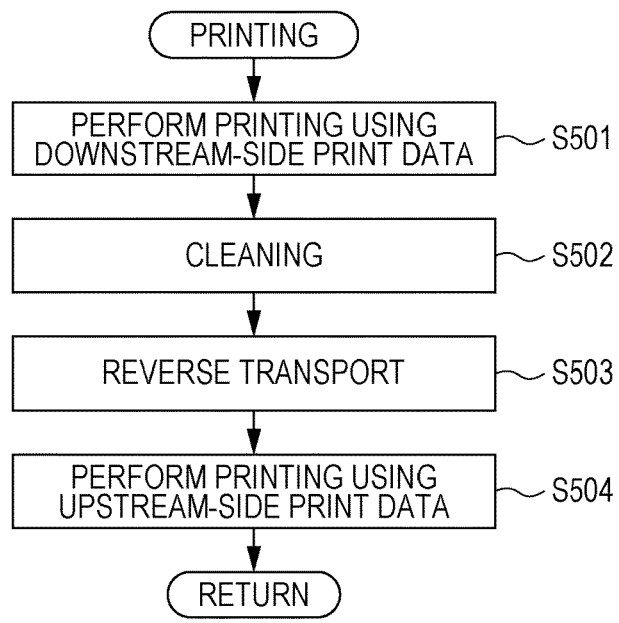
FIG. 8 is a flowchart illustrating an example of printing performed by the printer.
Figure 9:
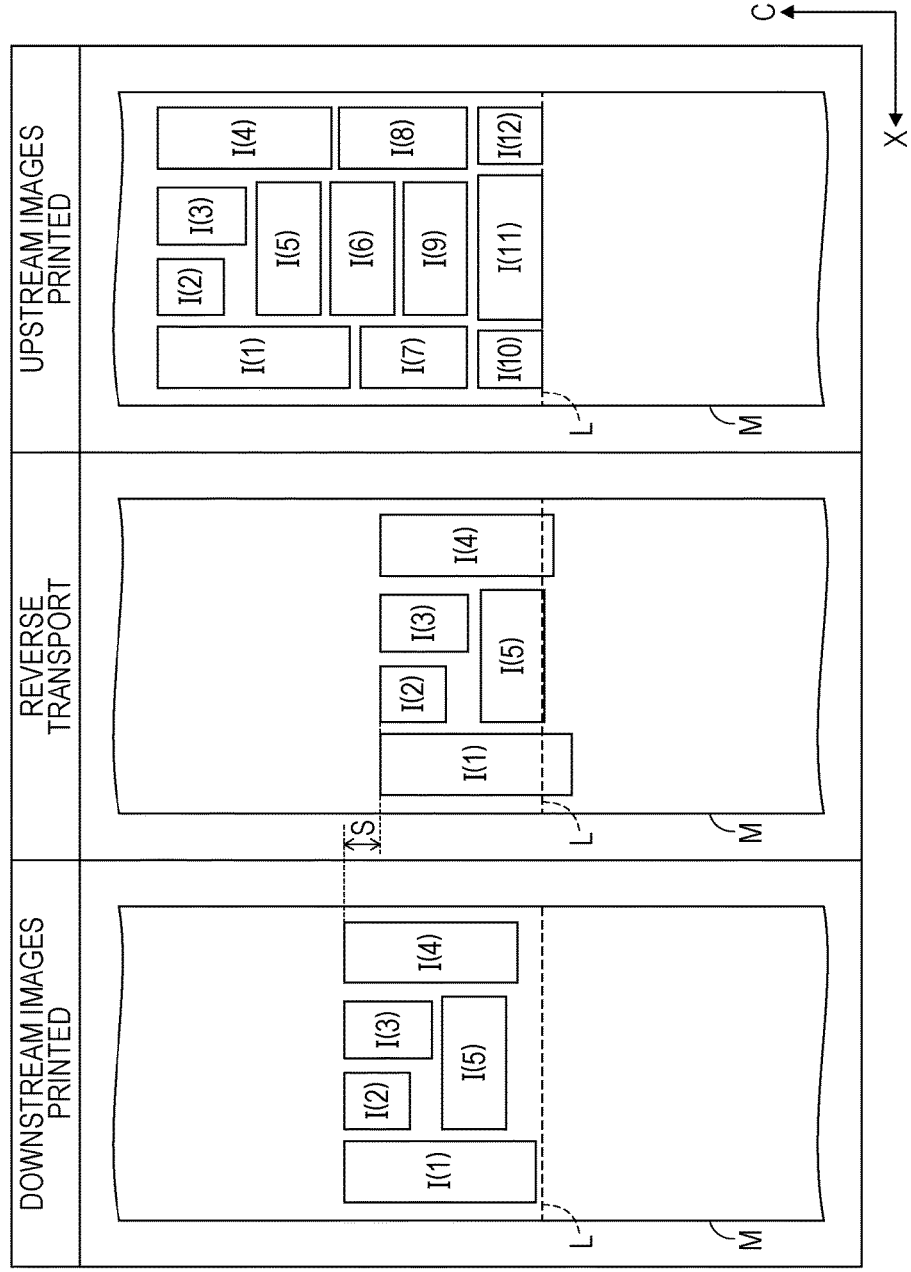
FIG. 9 is a diagram of an example of an operation performed in accordance with the flowchart in FIG. 8.

FIG. 8 is a flowchart illustrating an example of printing performed by the printer. FIG. 9 is a diagram illustrating an example of an operation performed in accordance with the flowchart in FIG. 8. In step S501, the controller 32 causes the print performing unit 31 to print the images I(1) to I(5) specified in the downstream-side print data Dpd received from the halftone performing unit 233. As a result, as illustrated in the column titled "DOWNSTREAM IMAGES PRINTED" in FIG. 9, the images I(1) to I(5) are printed on the printing medium M at a position downstream of the virtual straight line L in the transport direction C (i.e., the ink landing range of the print head 319). The controller 32 then outputs a cleaning command to the print performing unit 31 so that cleaning is performed on the print head 319 in accordance with the cleaning command (step S502).

When the print head 319 is cleaned, the controller 32 transports (reverse transports) the printing medium M upstream in the transport direction C in accordance with the reverse transport command received from the halftone performing unit 233. As illustrated in the column titled "REVERSE TRANSPORT" in FIG. 9, the printing medium M is transported upstream in the transport direction C by the amount S from a position at which the images I(1) to I(5) are printed. In step S504, the controller 32 causes the print performing unit 31 to print the images I(6) to I(12) specified in the upstream-side print data Dpu received from the halftone performing unit 233. As a result, as illustrated in the column titled "UPSTREAM IMAGES PRINTED" in FIG. 9, the images I(6) to I(12) are printed on the printing medium M at a position upstream of the virtual straight line L in the transport direction C (i.e., the ink landing range of the print head 319). The plurality of images I(1) to (12) is thus printed on the printing medium M as arranged in accordance with nesting in step S202 (i.e., as arranged with respect to an aspect illustrated in the column titled "AFTER NESTING" in FIG. 5).

In the embodiment configured as described above, an interruption timing Ts at which printing is interrupted in the printer 3 that transports the printing medium M in the transport direction C and that performs printing on the printing medium M (step S203) is obtained. In the embodiment, a virtual straight line L is arranged to extend through the virtual range R in the scan direction X at a position corresponding to an interruption timing Ts in the virtual range R in which the plurality of images I(1) to I(12) is arranged (step S204), and the plurality of images I(1) to I(12) are separated and arranged in the virtual range R divided by the virtual straight line L into a downstream region Rd and an upstream region Ru in the transport direction C (steps S205 and S206). In other words, in the embodiment, the plurality of images I are separated and arranged in a virtual manner in the downstream region Rd and the upstream region Ru so that the images do not to lie on the position (virtual straight line L) corresponding to the interruption timing Ts at which printing is interrupted in the printer 3. In the embodiment, downstream-side print data Dpd specifying the images I(1) to I(5) arranged in the downstream region Rd and upstream-side print data Dpu specifying the images I(6) to I(12) arranged in the upstream region Ru are created and output to the printer 3. As a result, interruption to printing of the images I can be suppressed, as much as possible, in the printer 3 that performs printing using the downstream-side print data Dpd and the upstream-side print data Dpu.

Specifically, the arrangement determination unit 231 arranges the plurality of images I(1) to I(12) in the virtual range R without taking into account the virtual straight line L (step S202). The arrangement determination unit 231 then moves, upstream in the transport direction C and away from the virtual straight line L, the images I(6) to I(12) each having an upstream end Pu located upstream of the virtual straight line L in the transport direction C so that the images I(6) and I(8) lying on the virtual straight line L arranged in the virtual range R are moved upstream in the transport direction C and away from the virtual straight line L (steps S205 and S206). The plurality of images I(1) to I(12) can thus be appropriately separated and arranged in the downstream region Rd and the upstream region Ru.

After the images I(1) to I(5) specified in the downstream-side print data Dpd are printed and before the images I(6) to I(12) specified in the upstream-side print data Dpu are printed, the halftone performing unit 233 outputs, to the printer 3, a reverse transport command that provides an instruction to transport the printing medium M upstream in the transport direction C. In other words, the halftone performing unit 233 can cause the printer 3 to transport the printing medium M in accordance with the reverse transport command to adjust, on the printing medium M, a gap between the plurality of images I(1) to I(5) specified in the downstream-side print data Dpd and the plurality of images I(6) to I(12) specified in the upstream-side print data Dpu to save space on the printing medium M.

Specifically, the reverse transport command provides an instruction to transport the printing medium M upstream in the transport direction C from a position at which the images I(1) to I(5) specified in the downstream-side print data Dpd are printed by a reverse transport amount corresponding to the amount S with which the images I(6) to I(12) are moved by the arrangement determination unit 231 in a virtual manner. The printing medium M can thus be transported downstream in the transport direction C by an amount necessary to ensure space and be saved appropriately.

The printer 3 interrupts printing in order to perform cleaning of the print head 319. In response to this, the arrangement determination unit 231 obtains, as an interruption timing Ts, a timing at which cleaning is performed. With the configuration, interruption to printing of the images I to enable the printer 3 to perform cleaning can be suppressed as much as possible.

The RIP 232 first performs rendering of the images I(1) to I(5) in the downstream region Rd and then performs rendering of the images I(6) to I(12) in the upstream region Ru. In response to this, the halftone performing unit 233 creates downstream-side print data Dpd by performing a halftone process on the images I(1) to I(5) arranged in the downstream region Rd and having undergone rendering performed by the RIP 232, while the RIP 232 performs rendering of the images I(6) to I(12) in the upstream region Ru. With the configuration, after the images I(1) to I(5) in the downstream region Rd undergo rendering, the halftone process is performed on the images I(1) to I(5) in the downstream region Rd, while rendering is performed on the images I(6) to I(12) in the upstream region Ru. In other words, before the rendering of the images I(6) to I(12) in the upstream region Ru is completed, the halftone process is immediately performed on the images I(1) to I(5) in the downstream region Rd. The images I(1) to I(5) arranged in the downstream region Rd and having undergone the halftone process are then output to the printer 3. As a result, printing begins promptly.

From another viewpoint, in the above-described embodiment, the plurality of images I(1) to I(12) are separated into the images I(1) to I(5) that can be printed before the interruption timing Ts and the images I(6) to I(12) that cannot be printed before the interruption timing Ts. In the embodiment, the images I(1) to I(5) are arranged in the downstream region Rd that can be printed before the interruption timing Ts, and the images I(6) to I(12) are arranged in the upstream region Ru that can be printed after the interruption timing Ts. In the embodiment, downstream-side print data Dpd specifying the images I(1) to I(5) arranged in the downstream region Rd and upstream-side print data Dpu specifying the images I(6) to I(12) arranged in the upstream region Ru are created and output to the printer 3. As a result, interruption to printing of the images I can be suppressed, as much as possible, in the printer 3 that performs printing using the downstream-side print data Dpd and the upstream-side print data Dpu.

In the embodiment as described above, the printing system 1 corresponds to an example of the "printing system" according to the invention. The image processing apparatus 2 corresponds to an example of the "image processing apparatus" according to the invention. The arrangement determination unit 231 functions as an example of the "timing obtaining unit", the "division computing unit", and the "arrangement computing unit" according to the invention. The RIP 232 and the halftone performing unit 233 work together to function as an example of the "data creating unit" according to the invention. The RIP 232 corresponds to an example of the "rendering unit" according to the invention. The halftone performing unit 233 corresponds to an example of the "halftone processing unit" according to the invention. The printer 3 corresponds to an example of the "printer" according to the invention. The print head 319 corresponds to an example of the "head" according to the invention. The printing medium M corresponds to an example of the "printing medium" according to the invention. The transport direction C corresponds to an example of the "first direction" according to the invention. The scan direction X corresponds to an example of the "second direction" according to the invention. The virtual range R corresponds to an example of the "target area" according to the invention. The virtual straight line L corresponds to an example of the "virtual straight line" according to the invention. The downstream region Rd corresponds to an example of the "first region" according to the invention. The upstream region Ru corresponds to an example of the "second region" according to the invention. The downstream-side print data Dpd corresponds to an example of the "first print data" according to the invention. The upstream-side print data Dpu corresponds to an example of the "second print data" according to the invention. The images I correspond to examples of the "images" according to the invention. The images I(1) to I(12) correspond to examples of the "plurality of images" according to the invention. The images I(1) to I(5) correspond to examples of the "first images" according to the invention. The images I(6) to I(12) correspond to examples of the "second images" according to the invention.

The invention is not limited to the above-described embodiment, but can be variously modified within the scope and spirit of the invention. For example, in step S503 in the above-described embodiment, the printing medium M is reverse-transported by the amount S in step S206. The reverse transport amount of the printing medium M in step S503 is not however always limited to an amount equal to the amount S in step S206. In other words, even when a reverse transport amount is less than the amount S, the images I(1) to I(5) and the images I(6) to I(12) can be printed close together on the printing medium M to save space on the printing medium M.

Reverse transport of the printing medium M in step S503 may otherwise be omitted. Even with this modification example, interruption to printing of the images I can be suppressed, as much as possible.

Other specific aspects can be variously applied in addition to the above-described aspects of the arrangement determination process in which the plurality of images I(1) to I(12) is separated and arranged in the virtual range R divided by the virtual straight line L into the downstream and upstream sides in the transport direction C. FIG. 10 is a flowchart illustrating a modified example of the arrangement determination process performed in step S101 in FIG. 3. FIG. 11 is a diagram illustrating an example of an arithmetic operation performed in accordance with the flowchart in FIG. 10. In step S211, the arrangement determination unit 231 accepts a print command entered via the UI 21. In the example, the accepted print command provides an instruction to perform nesting printing of a plurality of images I.

In step S212, the arrangement determination unit 231 obtains a printing-interruption timing Ts from the controller 32 of the printer 3. The arrangement determination unit 231 arranges a virtual straight line L at a position corresponding to the interruption timing Ts in the virtual range R (step S213). The arrangement determination unit 231 determines arrangement of some images, i.e., the images I(1) to I(5) among the plurality of images I(1) to I(12), by performing nesting of the images downstream of the virtual straight line L (step S214). As illustrated in the column titled "AFTER DOWNSTREAM IMAGE NESTING" in FIG. 11, the images I(1) to I(5) are thus optimally arranged downstream of the virtual straight line L, i.e., in the downstream region Rd of the virtual range R. The arrangement determination unit 231 determines arrangement of the images I(6) to I(12), which are different from the images I(1) to I(5), among the plurality of images I(1) to I(12) by performing nesting of the images upstream of the virtual straight line L (step S215). As illustrated in the column titled "AFTER UPSTREAM IMAGE NESTING" in FIG. 11, the images I(6) to I(12) are thus optimally arranged upstream of the virtual straight line L, i.e., in the upstream region Ru of the virtual range R.

In such a modification example, the arrangement determination unit 231 first arranges the virtual straight line L in the virtual range R and then arranges some images (images I(1) to I(5)) among the plurality of images I(1) to I(12) in the downstream region Rd so that the images do not lie on the virtual straight line L and remaining images (images I(6) to I(12)) among the plurality of images I(1) to I(12) in the upstream region Ru so that the remaining images do not lie on the virtual straight line L. The plurality of images I(1) to I(12) can thus be appropriately separated and arranged in the downstream region Rd and the upstream region Ru.

In the printer 3, a printing-interruption timing Ts is not limited to a timing to perform cleaning. In other words, printing can be interrupted when the printing medium M is replaced, when an ink is replaced, or at a timing specified by a user, for example. In steps S203 and S212, such a timing may be obtained as an interruption timing Ts.

The above-described example has exemplified that the single interruption timing Ts is obtained in steps S203 and S212. The above-described embodiment can however be applied not only when a single interruption timing Ts occurs, but also when a plurality of interruption timings Ts occurs. In other words, by arranging a virtual straight line L per interruption timing Ts and performing the arrangement determination process in FIG. 4 per the virtual straight line L, a plurality of images I may be separated and arranged in a virtual manner downstream and upstream of the virtual straight line L in the transport direction C to create print data Dp.

The number of images I illustrated in the embodiment is merely an example. The above-described embodiment can also be applied, even when the number of the images I are increased or decreased.

What is claimed is:

1. An image processing apparatus comprising:
a storage; and
an image processor electrically communicating with the storage, the image processor being configured with a central processing unit comprising:
a timing obtaining unit that obtains, at a time of creating print data for a printer in communication with the image processing apparatus, an interruption timing at which printing is interrupted in the printer that transports a printing medium in a first direction and that performs printing on the printing medium;

a division computing unit that arranges, at a position corresponding to the interruption timing in a target area in which a plurality of images is arranged, a virtual straight line extending through the target area of the printing medium in a second direction that is perpendicular to the first direction;

an arrangement computing unit that separates and arranges the plurality of images in the target area of the printing medium divided by the virtual straight line into a first region downstream in the first direction and a second region upstream in the first direction; and a data creating unit that creates and outputs, to the printer, first print data specifying images arranged in the first region, second print data specifying images arranged in the second region, among the plurality of images, and reverse transport data specifying a reverse transport movement for the printing medium between printing of the images in the first region and printing images in the second region to control the printer.

2. The image processing apparatus according to claim 1, wherein the arrangement computing unit arranges the plurality of images in the target area without taking into account the virtual straight line arranged in the target area and then separates and arranges the plurality of images in the first and second regions by shifting, among the plurality of images, a position of images each having an upstream end in the first direction located upstream of the virtual straight line to move images lying on the virtual straight line among the plurality of images, upstream in the first direction and away from the virtual straight line.

3. The image processing apparatus according to claim 2, wherein the data creating unit outputs as the reverse transport data a reverse transport command to the printer, after the images specified in the first print data are printed and before the images specified in the second print data are printed, the reverse transport command providing an instruction to transport the printing medium upstream in the first direction from a position at which the images specified in the first print data are printed by a reverse transport amount that corresponds to an amount with which the images are moved by the arrangement computing unit.

4. The image processing apparatus according to claim 1, wherein the arrangement computing unit arranges the virtual straight line in the target area and then separates and arranges the plurality of images in the first and second regions by arranging some images among the plurality of images away from the virtual straight line in the first region and by arranging remaining images among the plurality of images away from the virtual straight line in the second region.

5. The image processing apparatus according to claim 1, wherein the printer interrupts printing to perform cleaning of a head, and the timing obtaining unit obtains, as the interruption timing, a timing at which the cleaning is performed.

6. The image processing apparatus according to claim 1, wherein the data creating unit includes:

a rendering unit that performs rendering of the images in the first region and then performs rendering of the images in the second region; and a halftone processing unit that creates the first print data by performing, while the rendering unit performs rendering of the images in the second region, a halftone process on the images in the first region on which rendering has been performed by the rendering unit.

7. An image processing apparatus comprising:

a storage; and an image processor electrically communicating with the storage, the image processor being configured with a central processing unit comprising:

a timing obtaining unit, at a time of creating print data for a printer in communication with the image processing apparatus, that obtains an interruption timing at which printing is interrupted in a printer that transports a printing medium and that performs printing on the printing medium;

an arrangement determination unit that separates a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing; and a data creating unit that creates and outputs, to the printer, first print data specifying the first images arranged in the first region, second print data specifying the second images arranged in the second region, and reverse transport data specifying a reverse transport movement for the printing medium between printing of the images in the first region and printing images in the second region to control the printer.

8. A printing system comprising:

a printer that transports a printing medium in a first direction and that performs printing on the printing medium; and an image processing apparatus including:

a storage; and an image processor electrically communicating with the storage, the image processor being configured with a central processing unit comprising:

a timing obtaining unit that obtains, at a time of creating print data for a printer in communication with the image processing apparatus, an interruption timing at which printing is interrupted in the printer;

a division computing unit that arranges, at a position corresponding to the interruption timing in a target area of the printing medium in which a plurality of images is arranged, a virtual straight line extending through the target area in a second direction that is perpendicular to the first direction;

an arrangement computing unit that separates and arranges the plurality of images in the target area of the printing medium divided by the virtual straight line into a first region downstream in the first direction and a second region upstream in the first direction; and a data creating unit that creates and outputs, to the printer, first print data specifying images arranged in the first region, second print data specifying images arranged in the second region, among the plurality of images, and reverse transport data specifying a reverse transport movement for the printing medium between printing of the images in the first region and printing images in the second region to control the printer, wherein the printer prints the images specified in the first print data on the printing medium and the images specified in the second print data on the printing medium.

9. A printing system comprising:
a printer that transports a printing medium and that performs printing on the printing medium; and
an image processing apparatus including:
a storage; and
an image processor electrically communicating with the storage, the image processor being configured with a central processing unit comprising:
a timing obtaining unit, at a time of creating print data for a printer in communication with the image processing apparatus, that obtains an interruption timing at which printing is interrupted in the printer;
an arrangement determination unit that separates a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing; and
a data creating unit that creates and outputs, to the printer, first print data specifying the first images arranged in the first region, second print data specifying the second images arranged in the second region, and reverse transport data specifying a reverse transport movement for the printing medium between printing of the images in the first region and printing images in the second region to control the printer, wherein
the printer prints the first images specified in the first print data on the printing medium and the second images specified in the second print data on the printing medium.

10. An image processing method comprising:
obtaining an interruption timing, at a time of creating print data for a printer in communication with the image processing apparatus, at which printing is interrupted in a printer that transports a printing medium in a first direction and that performs printing on the printing medium;
arranging, at a position corresponding to the interruption timing in a target area in which a plurality of images is arranged, a virtual straight line extending through the target area of the printing medium in a second direction that is perpendicular to the first direction;
separating and arranging the plurality of images in the target area of the printing medium divided by the virtual straight line into a first region downstream in the first direction and a second region upstream in the first direction; and
creating and outputting, to the printer, first print data specifying images arranged in the first region, second print data specifying images arranged in the second region, among the plurality of images, and reverse transport data specifying a reverse transport movement for the printing medium between printing of the images in the first region and printing images in the second region to control the printer.

11. An image processing method comprising:
obtaining an interruption timing, at a time of creating print data for a printer in communication with the image processing apparatus, at which printing is interrupted in a printer that transports a printing medium and that performs printing on the printing medium;
separating a plurality of images into first images printing of which is completed before the interruption timing and second images printing of which is uncompleted before the interruption timing to arrange the first images in a first region in which printing is performed before the interruption timing and the second images in a second region in which printing is performed after the interruption timing; and
creating and outputting, to the printer, first print data specifying the first images arranged in the first region, second print data specifying the second images arranged in the second region, and reverse transport data specifying a reverse transport movement for the printing medium between printing of the images in the first region and printing images in the second region to control the printer.

* * * * *